United States Patent [19]

Zaleski-Zamenhof et al.

[11] 4,152,087
[45] May 1, 1979

[54] MARINE PLATFORM DESIGNED TO WITHSTAND SEISMIC SHOCKS

[75] Inventors: Louis C. Zaleski-Zamenhof, Sceaux; Jean-Pierre F. Bonin, Paris, both of France

[73] Assignee: Compagnie Generale pour les Developments Richesses Sous-Marines "C.G. Doris", Paris, France

[21] Appl. No.: 841,197

[22] Filed: Oct. 11, 1977

[30] Foreign Application Priority Data

Oct. 11, 1976 [FR] France .............................. 76 30460

[51] Int. Cl.² .......................... E02D 21/00; E04H 9/02
[52] U.S. Cl. ...................................... 405/195; 52/167; 248/634
[58] Field of Search ................................... 61/86–104, 61/50; 52/167; 248/22

[56] References Cited

U.S. PATENT DOCUMENTS

| 2,911,207 | 11/1959 | Coble et al. | 248/22 X |
|---|---|---|---|
| 3,638,377 | 2/1972 | Caspe | 52/167 |
| 3,730,463 | 5/1973 | Richard | 52/167 X |
| 4,001,990 | 1/1977 | Chase et al. | 52/167 |
| 4,045,968 | 9/1977 | Gerwick | 61/86 |

Primary Examiner—Dennis L. Taylor
Attorney, Agent, or Firm—Neil F. Markva

[57] ABSTRACT

A coupling system provides a controlled decoupling of interconnected component sections of a marine platform structure less rigid under seismic shock while maintaining sufficient overall ridigity to resist the action of swell. The coupling system comprises rigid interconnecting linkage parts, such as steel supports, and flexible interconnecting members, such as "Neoprene" supports, incorporated in the structure. The rigid linkage parts have a structural ridigity sufficient to maintain the overall rigidity of the platform but are effective to break following a seismic shock. The flexible interconnecting members are held in reserve and arranged to back up the rigid integrating parts. The flexible members have structural characteristics effective to maintain the controlled decoupling of the component sections when the steel supports deform or break. The coupling system providing the controlled decoupling is located at an upper level of the structure, preferably above water level, for ease of repair.

9 Claims, 2 Drawing Figures

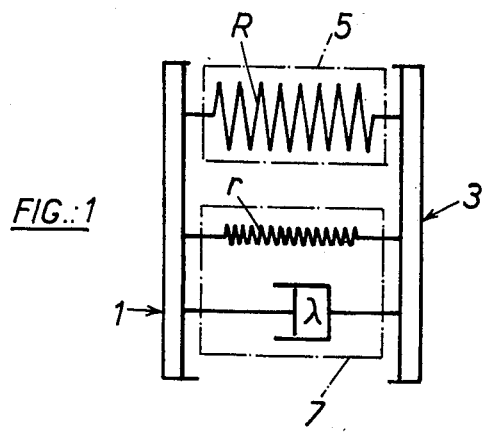
FIG.:1
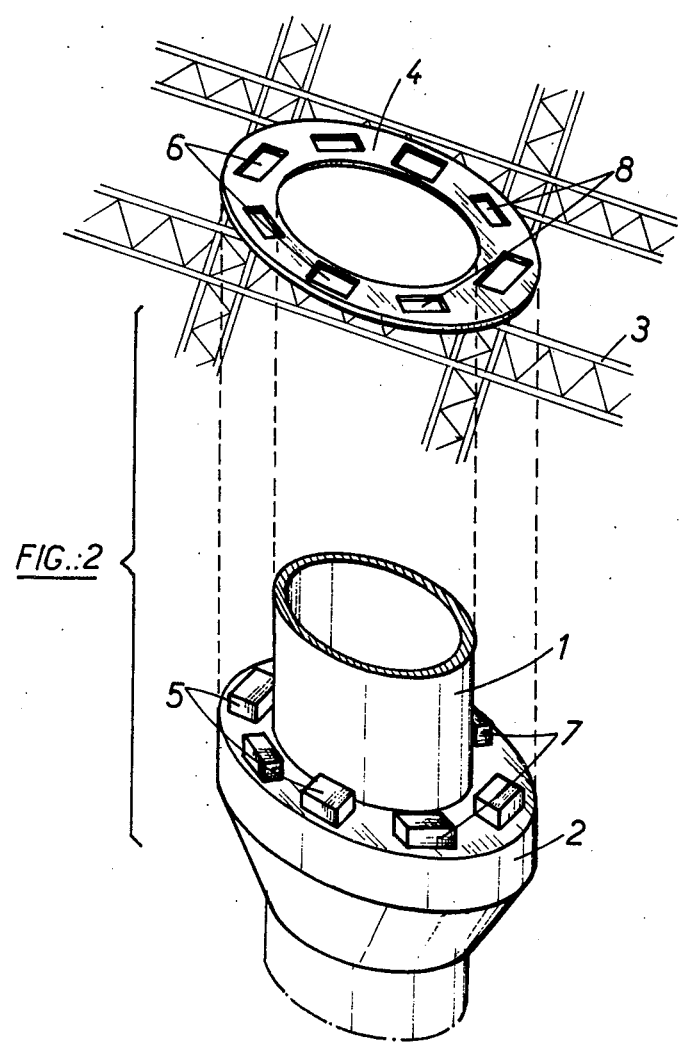
FIG.:2

MARINE PLATFORM DESIGNED TO WITHSTAND SEISMIC SHOCKS

BACKGROUND OF THE INVENTION

Offshore marine platforms resting on the bottom of the sea have not only to resist stresses due to swell but also stresses due to seismic shocks, this latter factor even being regarded as predominant in areas considered subject to strong seismic phenomena. However, the two types of disturbance proceeding from swell and from a seismic shock respectively, manifest themselves in frequency ranges far apart from each other. The result is that a structure which is designed to resist swell turns out to be too rigid to resist seismic shocks and that, on the contrary, a structure designed to resist seismic shocks is not sufficiently rigid to resist swell.

This has led, quite naturally, to the concept of relieving a disturbance reaction by putting into effect a so-called "controlled decoupling" system for platform structures. More precisely, it has been suggested that the structure be designed rigidly with regard to the action of swell, at the same time arranging integrating linkage parts of the said structure, which are designed to break following a seismic shock, in such a manner as to bring into play flexible interconnecting members held in reserve and arranged to back up the temporary integrating parts.

SUMMARY OF THE INVENTION

This invention relates to improvements made to such anti-seismic platforms wherein a coupling system is used for interconnecting component sections of a marine platform structure. The system in question is located at an upper level, preferably above water level, of the platform structure and preferably, at the level of a bridge portion of the platform structure. The coupling system is disposed at the point of connection of the bridge portion to its support on a pillar means comprising a central shaft or other vertical support embedded in the sea bottom. The coupling system provides a controlled decoupling of the component sections following a seismic shock.

In accordance with an important characteristic of this invention, the flexible members backing up the rigid integrating parts which are called upon the break are of an elastomer, more precisely chloroprene rubber described by the trade name "Neoprene" bringing with it, in addition to the required resilient resistance, a high degree of damping.

At the cessation of the seismic shocks which have caused the fracture of the said rigid interconnecting integrating parts, their rapid repair is undertaken in order to re-establish, without delay, the rigidity of the structure designed to resist the swell, such rapid repair presenting no difficulty thanks to the accessibility of the parts in question which are located practically to hand. That is, the rigid parts and flexible members are located at an accessible level of the platform structure.

The following description with respect to the accompanying drawings, and given as a non-limiting example, will explain how the invention can be carried out, characteristics emerging from the text as well as from the drawings forming, of course, a part of the said invention.

FIG. 1 is a diagram illustrating the principle of controlled decoupling: and

FIG. 2 is a part view in perspective illustrating an embodiment of the invention.

DETAILED DESCRIPTION

There is shown in FIG. 2 the top part of a concrete column or central shaft 1, featuring a corbel 2 for supporting a bridge. The bridge framework 3 as seen from below, is equipped with a steel plate 4 serving to spread the stresses over the supports.

In the marine platform structure of the type constructed for incorporation of the coupling system of this invention, a perforated cylindrical wall (not shown) serves as a support for the bridge framework 3 and encircles the central shaft 1. Shaft 1 serves to take up the horizontal stresses due, for example, to the wind.

Framework 3 and central shaft 1 constitute interconnecting component sections of a marine platform structure. As can be clearly seen from FIG. 2, the main idea of this invention consists in locating the desired coupling system designed to decouple the component sections of the platform structure at the level of the connection between the bridge framework 3 and the central shaft 1. The bridge framework 3 is attached to central shaft 1, on the one hand, by rigid steel supports or linkage parts 5 protruding from the seating surface of the corbel 2 and projecting into corresponding apertures 6 in the plate 4. On the other hand, similarly shaped, flexible "Neoprene" supports or interconnecting members 7 project into corresponding apertures 8 in the plate 4. The rigid steel supports 5 have a structural rigidity sufficient to maintain the overall rigidity of the marine platform, but are calculated to break or deform with a seismic shock. Flexible "Neoprene" supports 7 have structural characteristics effective to maintain the controlled decoupling of the component sections when linkage parts 5 break. Supports or flexible interconnecting members 7 normally do not play a part in supporting bridge framework 3 but provide a high degree of damping $\lambda$ (see FIG. 1 in which R represents the resistance of the rigid steel supports 5 and r the resilient resistance of the flexible supports 7, shown parallel to R).

After a seismic shock, the steel supports 5 break or deform and the "Neoprene" supports 7 come into play. The rigidity r of these latter and their degree of damping $\lambda$ are calculated in such a manner that movements of the bridge are permitted. However, the interconnection of the component sections of the platform structure is maintained.

The flexible supports 7 may, with advantage, be the inter-leaved rubber/metal bodies manufactured by the Kleber-Colombes Company under the name of "Sandwich Type 4152" of which the synthetic rubber offers a viscoelastic shock absorbing coefficient of the order of 20%.

The described embodiment is only one example of the invention, and modification will be possible, notably by the substitution of equivalent techniques, without departing from the scope of the invention as defined in the appended claims.

We claim:

1. A coupling system for interconnecting component sections of a marine platform structure to render said marine platform structure less rigid under seismic shock while maintaining sufficient overall rigidity to resist the action of swell in a sea, said coupling system comprising:

(a) a plurality of rigid integrating linkage parts and a plurality of flexible interconnecting members being disposed on a component section of said structure,
(b) said rigid linkage parts having a structural rigidity sufficient to maintain said overall rigidity and being effective to break due to a seismic shock,
(c) said flexible interconnecting members having structural characteristics effective to maintain the decoupling of said component sections when said rigid linkage parts break,
(d) said rigid parts and flexible members being located at an accessible level of the platform structure.

2. The system as defined in claim 1 wherein
said accessible level is at a location above the water level on said platform structure.

3. The system as defined in claim 1 wherein
said rigid parts and said flexible members are disposed on the same component section.

4. The system as defined in claim 1 wherein
a first component section of the platform structure comprises a pillar means projecting above the sea surface and a second component section of the platform structure comprises a platform means connected to said pillar means,
said rigid parts and flexible members being located at the interconnection of said pillar means and said platform means.

5. The system as defined in claim 4 wherein
said pillar means has an upper seating surface on which said platform means is supported,
said rigid parts and flexible members are disposed on said upper seating surface.

6. The system as defined in claim 5 wherein
said rigid parts and flexible members comprise upwardly directed projections and
plate means includes openings to receive said projections,
said plate means being effective to rest against said upper seating surface.

7. The system as defined in claim 1 wherein
said flexible members are composed of elastomeric material.

8. The system as defined in claim 7 wherein
said elastomeric material comprises chloroprene rubber.

9. The system as defined in claim 1 wherein
said pillar means has an upper seating surface, and
said platform means comprises a bridge portion which is supported on said upper seating surface.

* * * * *